US011673685B2

(12) United States Patent
El Haloui et al.

(10) Patent No.: US 11,673,685 B2
(45) Date of Patent: Jun. 13, 2023

(54) USAGE BASED PROPELLER LIFE MONITORING

(71) Applicant: Ratier-Figeac SAS, Figeac (FR)

(72) Inventors: Abdellah El Haloui, Figeac (FR); Brian P. Huth, West Hartford, CT (US); Mark Vignali, Simsbury, CT (US); Olivier Lacroix, Beduer (FR)

(73) Assignee: RATIER-FIGEAC SAS, Figeac (FR)

( * ) Notice: Subject to any disclaimer, the term of this patent is extended or adjusted under 35 U.S.C. 154(b) by 95 days.

(21) Appl. No.: 17/184,826

(22) Filed: Feb. 25, 2021

(65) Prior Publication Data
US 2021/0309384 A1    Oct. 7, 2021

(30) Foreign Application Priority Data
Feb. 28, 2020 (EP) .................................. 20305204

(51) Int. Cl.
*G05B 23/02* (2006.01)
*B64D 45/00* (2006.01)

(52) U.S. Cl.
CPC ...... *B64D 45/00* (2013.01); *B64D 2045/0085* (2013.01)

(58) Field of Classification Search
CPC ............ B64C 11/00; B64C 11/305; B64D 2045/0085; B64D 45/00; B64F 5/00; B64F 5/60; G01M 13/00; G01M 5/0016; G01M 5/0041; G06Q 10/20
See application file for complete search history.

(56) References Cited

U.S. PATENT DOCUMENTS

| | | | | |
|---|---|---|---|---|
| 3,387,120 A | * | 6/1968 | Funkjackn | G01M 5/0033 702/42 |
| 3,744,300 A | * | 7/1973 | Fleury | G01M 99/00 73/764 |
| 4,112,747 A | * | 9/1978 | Aldridge | G07C 3/00 73/764 |
| 4,336,595 A | * | 6/1982 | Adams | G07C 3/00 702/34 |

(Continued)

FOREIGN PATENT DOCUMENTS

| | | |
|---|---|---|
| CA | 3040494 A1 | 10/2019 |
| CN | 105157968 A | 12/2015 |

(Continued)

OTHER PUBLICATIONS

CN105157968A Abstract, 2 pages.
(Continued)

*Primary Examiner* — Kayla Mccaffrey
(74) *Attorney, Agent, or Firm* — Cantor Colburn LLP

(57) ABSTRACT

A system for monitoring propeller health includes a processing unit having a processor which is programmed to apply a plurality of algorithms to inputted aircraft parameter data. The system also includes a plurality of data inputs for inputting aircraft parameter data into the algorithms, wherein the processor is configured to apply the physics based algorithms to the aircraft parameter data to determine at least the fatigue life consumption of one or more critical components of a propeller. In addition, the system includes an output device which is able to output an indication of the determined fatigue life consumption to an observer.

16 Claims, 2 Drawing Sheets

(56) References Cited

U.S. PATENT DOCUMENTS

| | | | | |
|---|---|---|---|---|
| 4,524,620 | A | * | 6/1985 | Wright .................. G01N 29/14 416/61 |
| 4,733,361 | A | * | 3/1988 | Krieser ................ G01M 13/02 702/34 |
| 4,955,269 | A | * | 9/1990 | Kendig .................... G07C 3/00 73/660 |
| 6,289,289 | B1 | * | 9/2001 | Zweifel ............... G01M 5/0033 702/144 |
| 6,449,565 | B1 | * | 9/2002 | Budrow .................. G07C 3/00 702/42 |
| 7,454,297 | B2 | * | 11/2008 | Balestra ............... G07C 5/0841 702/42 |
| 7,555,951 | B2 | * | 7/2009 | Shadman ................ G01H 1/14 73/659 |
| 7,684,936 | B2 | * | 3/2010 | Bechhoefer ........ G05B 23/0283 702/183 |
| 7,824,147 | B2 | | 11/2010 | Morris et al. |
| 7,930,112 | B2 | * | 4/2011 | Mattes ................ G01M 5/0033 702/36 |
| 7,941,281 | B2 | * | 5/2011 | Rai .................... G05B 23/0245 702/34 |
| 9,103,741 | B2 | * | 8/2015 | Baik .................. G01M 5/0016 |
| 10,573,099 | B2 | * | 2/2020 | Wang .................. G07C 5/0808 |
| 10,598,265 | B2 | * | 3/2020 | Seminel .................. F16H 57/01 |
| 10,717,545 | B2 | * | 7/2020 | El Haloui ............... B64C 11/30 |
| 10,746,626 | B2 | * | 8/2020 | Williamson ....... G05B 23/0283 |
| 11,084,604 | B2 | * | 8/2021 | Benoit .................. B64C 11/20 |
| 11,280,700 | B2 | * | 3/2022 | Seminel ................ B64C 11/00 |
| 2004/0225474 | A1 | * | 11/2004 | Goldfine ............ G05B 23/0245 702/183 |
| 2006/0080010 | A1 | * | 4/2006 | Gaiani ................ G01P 15/0891 701/31.4 |
| 2011/0264310 | A1 | | 10/2011 | Bates et al. |
| 2017/0115179 | A1 | * | 4/2017 | Williamson ............ G01M 7/02 |
| 2017/0315020 | A1 | * | 11/2017 | Seminel ................. B64D 25/00 |
| 2018/0079522 | A1 | * | 3/2018 | El Haloui ............... B64C 11/30 |
| 2018/0307784 | A1 | | 10/2018 | Stevens et al. |
| 2018/0327111 | A1 | | 11/2018 | Huth et al. |
| 2018/0327112 | A1 | | 11/2018 | Huth et al. |
| 2018/0342116 | A1 | * | 11/2018 | Wang .................... G06Q 10/20 |
| 2019/0322392 | A1 | * | 10/2019 | Benoit ..................... B64F 5/60 |
| 2020/0339286 | A1 | * | 10/2020 | Al-Ameri ............ G01M 99/00 |
| 2021/0254497 | A1 | * | 8/2021 | El Haloui ............ B64C 27/463 |

FOREIGN PATENT DOCUMENTS

| | | |
|---|---|---|
| CN | 109885875 A | 6/2019 |
| EP | 3239039 A1 | 11/2017 |
| EP | 3296195 A1 | 3/2018 |
| EP | 3403927 A1 | 11/2018 |
| RU | 2599108 C1 | 10/2016 |
| RU | 2687228 C1 | 5/2019 |
| RU | 2700535 C2 | 9/2019 |

OTHER PUBLICATIONS

CN109885875A Abstract, one page.
RU2599108C1 Abstract, 2 pages.
RU2687228C1 Abstract, 1 page.
RU2700535 (C2) Abstract, 2 pages.
Russian Search Report for RU Application No. 2021104168 dated Jul. 15, 2021, 2 pages.
Extended European Search Report for International Application No. 20305204.8 dated Aug. 25, 2020, 13 pages.
CA Office Action for Application No. 3,108,984, dated Mar. 31, 2022, 5 pages.

* cited by examiner

USAGE BASED PROPELLER LIFE MONITORING

FOREIGN PRIORITY

This application claims priority to European Patent Application No. 20305204.8 filed Feb. 28, 2020, the entire contents of which is incorporated herein by reference.

FIELD

The present disclosure relates to a system for monitoring propeller health and a method using the system.

BACKGROUND

Propellers are used throughout the aviation industry as a method of providing thrust on aircraft. Propellers can be driven by any type of engine, though in modern aircraft they are typically driven by turbine engines.

Propellers comprise a central rotating hub with a plurality of rotating blades, each comprising an airfoil section which creates the thrust. As can be appreciated the propellers are crucial components of a propeller powered aircraft and therefore it is necessary that they are suitably maintained. A failure of the propeller can significantly reduce the thrust of the aircraft and may cause it to lack the required lift to maintain flight.

Flight hour (FH), flight cycle (FC) and calendar day are the basic operational parameters recorded in service in order to monitor propeller fatigue life and schedule maintenance activities. The use of these parameters to evaluate aircraft usage relies on assumptions that can lead to significantly different results compared to reality. As a result, life monitoring based on FH could result in under estimating the propeller fatigue life consumption. This could lead to the fatigue failure of critical propeller components, resulting in a potentially unsafe condition.

There is therefore a need to provide a system which can monitor the health of propellers more accurately to assess whether maintenance or replacement may be required.

SUMMARY

According to a first aspect, there is provided a system for monitoring propeller health comprising: a processing unit having a processor which is programmed to apply a plurality of algorithms to inputted aircraft parameter data; a plurality of data inputs for inputting aircraft parameter data into the algorithms, wherein the processor is configured to apply the physics based algorithms to the aircraft parameter data to determine at least the fatigue life consumption of one or more critical components of a propeller; and an output device which is able to output an indication of the determined fatigue life consumption to an observer.

The algorithms may be physics based algorithms or empirically derived algorithms.

The algorithms may be physics based and empirically derived algorithms.

The algorithms may be condition-determining algorithms. In particular, they may be condition-determining algorithms that are based on physics principles or they may have been derived through empirical reasoning.

The fatigue life consumption may be determined based on actual aircraft usage.

The system may comprise a propeller.

The output device may comprise a visual display in a cockpit of an aircraft.

The fatigue life consumption may be displayed as a percentage of an approved fatigue life figure. The fatigue life figure might be an aviation approved fatigue life figure.

An alert for maintenance may be triggered if the fatigue life consumption reaches a pre-determined threshold. The predetermined threshold may be in the range 80% to 99% of an approved fatigue life figure.

An alert for maintenance may be triggered if the propeller loading exceeds a predetermined value. The predetermined value may be a value in the range of 80% to 99% of a maximum propeller loading figure or it may be a value that is at or exceeds a 100% of a maximum propeller loading figure. This may be a predetermined propeller loading figure that is imposed for safety concerns.

An alert for maintenance may be triggered if a flight exhibits high life consumption. The life consumption may be a value in the range of 80% to 99% of a predetermined life consumption figure, for example, one which is considered safe for the aircraft or it may be a value that is at or exceeds a 100% of such a predetermined/maximum life consumption.

The processing unit may be a Full Authority Digital Engine Control (FADEC).

The aircraft parameter data may be supplied by the FADEC.

The system may comprise an aircraft having a plurality of sensors to detect different types of aircraft parameter data and communication circuits to feed the aircraft parameter data to the FADEC.

The aircraft data may comprise one or more of air speed, altitude, flap setting, aircraft attitude, pitch rate, roll rate, yaw rate and propeller rotational speed and optionally engine parameters including one or more of rotational speed, throttle setting, thrust, temperature, shaft horsepower, torque and pressure ratios.

According to a second aspect, there is provided a method of monitoring propeller health comprising: inputting aircraft parameter data into a plurality of algorithms; determining, by a processor of a processing unit, at least the fatigue life consumption of one or more critical components of a propeller using the plurality of algorithms based on the aircraft parameter data; and outputting an indication of the determined fatigue life consumption to an observer.

The algorithms may be physics based algorithms or empirically derived algorithms.

The algorithms may be physics based and empirically derived algorithms.

The algorithms may be condition-determining algorithms. In particular, they may be condition-determining algorithms that are based on physics principles or they may have been derived through empirical reasoning.

The method may further comprise the step of outputting the indication of the determined fatigue life consumption to an observer as a percentage of an approved fatigue life figure. The fatigue life figure may be one that is approved by an aviation authority.

The method may further comprise the step of comparing the fatigue life consumption to a predetermined threshold.

The method may further comprise the step of triggering an alert for maintenance if the fatigue life consumption reaches a pre-determined threshold.

BRIEF DESCRIPTION OF THE FIGURES

Certain embodiments of the disclosure are described below by way of example only and with reference to the accompanying drawings, in which.

DETAILED DESCRIPTION OF THE FIGURES

Aircraft maintenance requires the aircraft to be grounded for a period of time, which reduces the time the aircraft can be in operation and increases the per mile running costs of the aircraft.

Each propeller comprises multiple components, some of which can be labelled critical and others non-critical. Critical propeller components are the components that are essential for the normal functioning of the propeller. Each critical component can be assigned an aviation authority approved, service life-time which might be given in terms of flight hours (FH) based on extensive product testing to gain the approval. As the component approaches the approved service life-time, the product is usually replaced (since the probability of failure may start to increase significantly) or it may be possible to perform a repair. Fatigue properties may be a main consideration in the determination of an approved service life-time but other properties like creep, corrosion resistance, etc., may also be factors.

In current systems, basic operational parameters, such as flight hours, are used to determine the life time and service intervals for parts of an aircraft like a propeller, for example, the propeller blades, the propeller hub, and other parts exposed to cyclic stresses in the motor (e.g., turbine parts) or mountings. Other typical parameters that are used are flight cycle (FC) and calendar day, which are recorded during the service of the aircraft in order to monitor considerations like propeller fatigue life and on the basis of such considerations, schedule maintenance activities.

The way the FH, FC and calendar day parameters are used to evaluate the aircraft usage relies on assumptions that can lead to significantly different results when considering the actual usage of the aircraft components. If fatigue life monitoring based on these overestimates the component usage, then unnecessary maintenance may be incurred and parts may be replaced too early. Similarly if using these parameters leads to underestimating the fatigue life consumption, then this could have an adverse effect on the safety of the aircraft.

Figure 1:
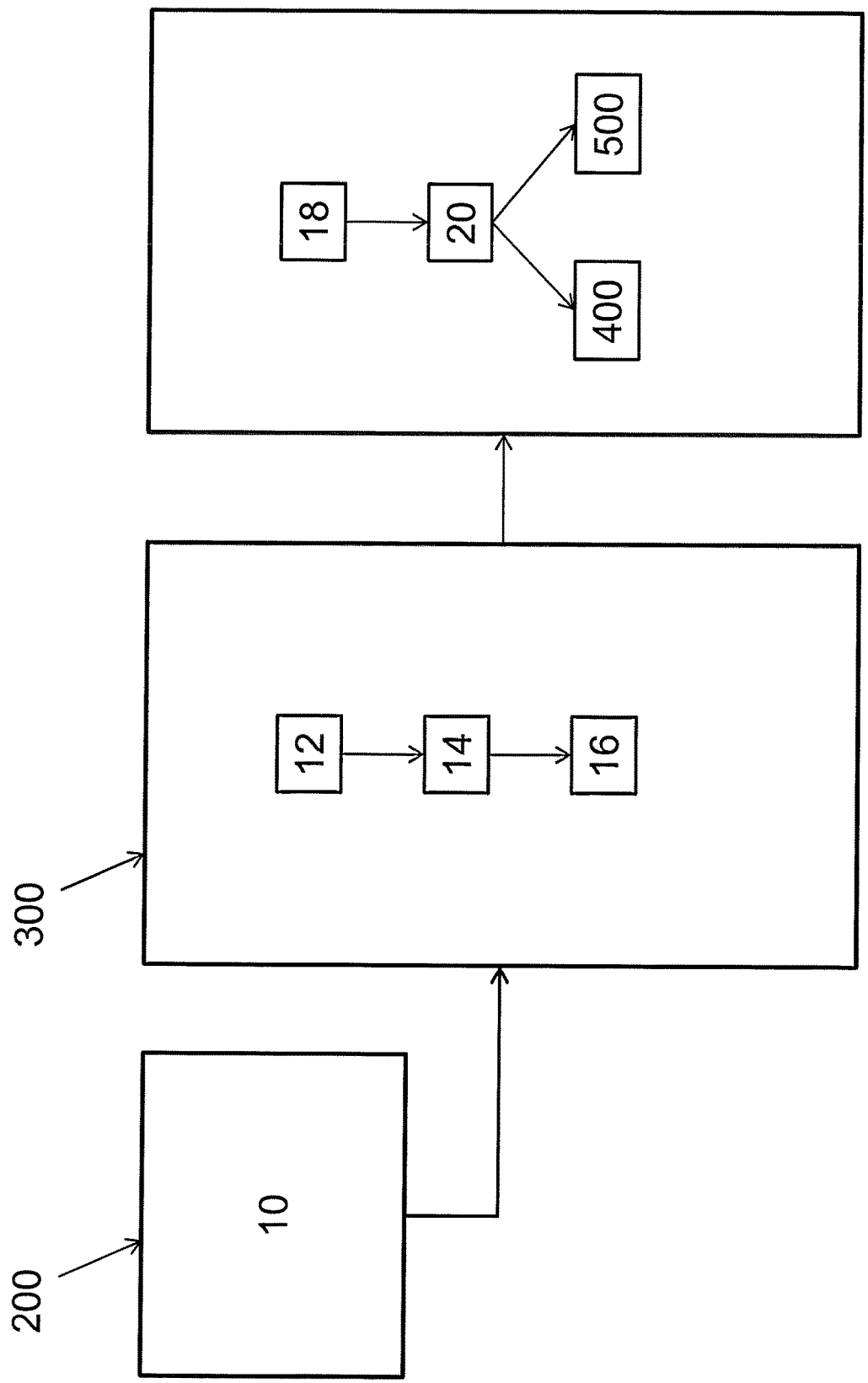
FIG. 1 shows a system for determining the life-time fatigue consumption of various critical components of a propeller based on received aircraft data.

In the embodiment of FIG. 1 the fatigue life monitoring is based on specific aircraft parameter data 10 using physical inputs, rather than the crude gauges of FH, FC and calendar days, though these parameters may be used too in the assessment of fatigue life monitoring. The propeller health monitoring system requires no instrumentation on the aircraft propellers other than the sensors that may already be present to inform the pilot of flight conditions. Instead the aircraft parameter data 10 for the component usage calculations can be taken from the FADEC (Full Authority Digital Engine Control) 200 during each flight or at the end of a given flight cycle.

The aircraft parameter data 10 taken from the FADEC 200 can be anything relevant to the fatigue life of the propeller. For example, typical aircraft parameter data may comprise one or more of air speed, altitude, propeller speed, propeller pitch, power, aircraft gross weight, load factor, etc. Aircraft parameter data 10 may further comprise propeller and engine parameter data, for example, rotational speed, throttle settings, thrust, engine temperature, engine pressure ratio, etc.

The aircraft parameter data provided can be for the whole flight cycle including various phases of the aircraft operations, in particular take-off, cruise, landing and reverse but may also relate to the climb and decent phases. The larger the range of flight phases monitored, the more accurate the calculated fatigue life component usage values may be.

The aircraft parameter data 10 stored in the FADEC 200 can be supplied to a processor 300 which comprises an aircraft flight phases detection system 12. The aircraft flight detection system 12 uses the aircraft parameter data 10 provided by the FADEC to determine the flight phase the aircraft is operating in.

The relevant aircraft parameter data can be introduced to a set of algorithms specifically developed for a propeller, and in particular to such algorithms that are tailored to the propeller's and/or the aircraft's characteristics. The algorithms may be physics based algorithms or empirically derived algorithms. Alternatively, the algorithms may comprise both physics based and empirically derived algorithms. The algorithms may be condition-determining algorithms. In particular, they may be condition-determining algorithms that are based on physics principles or they may have been derived through empirical reasoning. The algorithms may be tuned for each flight phase. Based on the aircraft parameter data inputs 10, the algorithms may incorporate load calculations 14 to determine loading conditions for each critical part of the propeller and determine the stresses on each critical component during the flight phase. Such a component might be a propeller blade, for example. Each propeller component may experience different loading conditions according to the flight phase.

Using the outputs from the load calculations 14, an analysis module 16 can determine the relationship between the load conditions and the fatigue stresses. The analysis module 16 can, for example, use Finite Element Analysis or Material Fatigue Curves. The outputs from the analysis module 16 can further be fed back into the algorithms. The algorithms can then be used to determine the consumption of actual fatigue life 18 for each critical propeller component.

Maintenance actions 20 can be scheduled based on fatigue life consumption of each critical part.

Figure 2:
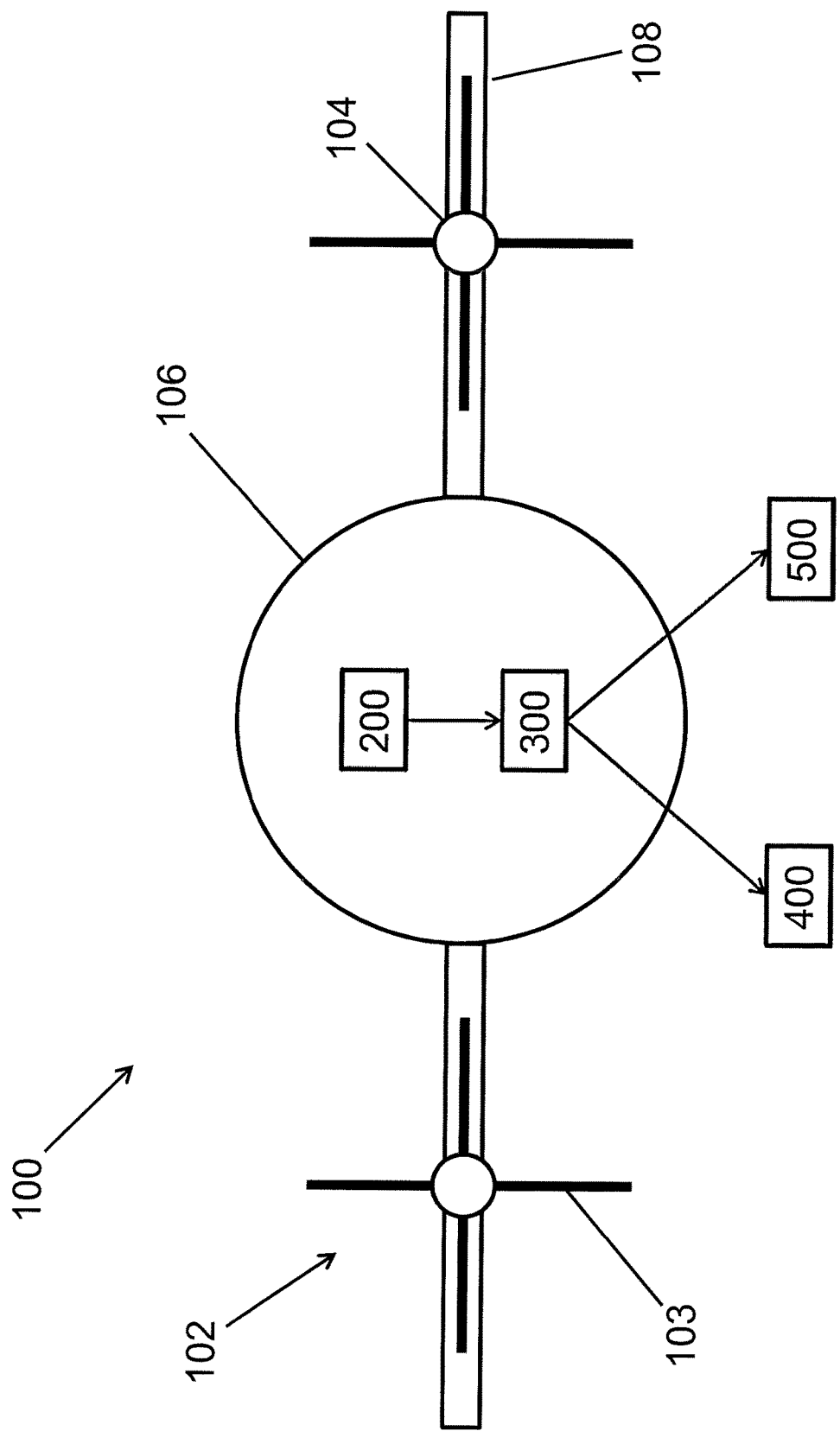
FIG. 2 shows an aircraft comprising a system for determining the life-time fatigue consumption of various critical components of a propeller based on received aircraft data.

FIG. 2 shows an aircraft 100 using the system of the present embodiment. The aircraft comprises a fuselage 106 and two wings 108. Each wing 108 comprises a propeller 102. It will be appreciated that each wing 108 may comprise additional propellers 102. For example, the aircraft may comprise four or even six propellers 102 in total, or indeed may comprise any number of propellers 102 in any arrangement. Alternatively, the aircraft 100 may comprise a single propeller 102 mounted to the fuselage. Moreover, other arrangements of wing and fuselage may be used.

Each propeller 102 comprises a propeller hub 104 and two or more blades 103 connected to the propeller hub 104. The propellers 102 in FIG. 2 are depicted as having four blades 103. Alternatively, the propellers 102 may comprise two, three, five or six blades 103 (or other numbers of blades).

The aircraft parameter data can be provided by the flight computer 200. The flight computer 200 may be a FADEC. The flight computer 200 is typically mounted within the fuselage 106. The aircraft parameter data is provided to a processor 300 which applies to set of algorithms to the data to determine the fatigue life consumption of the critical parts of the propeller 102.

The processor 300 could be a separate computing device, either on the aircraft or as part of a remote ground equipment where the data download and analysis is made using a device based on the ground. The processing and analysis of the aircraft parameter data may be performed on remote servers, e.g., using cloud based technology. Alternatively, the processor 300 could be a processing section of the FADEC/flight computer 200, or some other existing processor based device which is already part of the aircraft infrastructure.

The system may provide an output of the results of the calculated component consumption on a display 400 in the cockpit, for example, a display of the fatigue life consumption for each critical propeller component like a propeller blade. This could be represented as a percentage of fatigue life consumed for each component, for example, as compared to an aviation authority approved value. The cockpit crew can use the data from the display 400 to schedule maintenance accordingly, e.g. if a particular component is nearing the end of its fatigue life. The data can also notify the crew if they are operating the aircraft at conditions that cause a high rate of life consumption. The system may be able to display an alert for maintenance if the fatigue life consumption exceeds a pre-determined threshold. The pre-determined threshold may be between 80% and 99%, optionally 85% to 95%, optionally 90% of the approved service life.

The system can also allow for the calculated data to be downloaded to a server 500 on the ground after the end of a flight cycle. The server 500 on the ground can then conduct post processing of the flight data and fatigue life consumption of the critical parts. The data downloaded to the server 500 can be used to compile a database and can be connected to a component management system to monitor individually life consumption component by component.

The server 500 can download the data for numerous flight cycles for the same aircraft. The data within the resulting database can then be compared to analyse the fatigue life consumption over time.

The data from each flight cycle can be provided for different operating conditions to the server 500. The data can therefore be used to analyse the effect of different operating conditions on the rate of fatigue life consumption for various parts. This can be used by crew for future flight cycles to determine the appropriate operating conditions taking account of the effect that the conditions may have on the fatigue life consumption. Also, by analysing the rate of fatigue life consumption a better prediction of when the critical part is likely to reach its approved life limit can be determined. Excessive operating conditions can be avoided or managed accordingly.

The cockpit display can be updated in real-time throughout the course of any given flight. This can provide the crew with data for the various components of the propeller and the crew are then able to operate the aircraft accordingly. For example, in the event of a critical component of a particular propeller nearing the end of its fatigue life, the crew can, in an extreme situation, shut down that propeller or run it a reduced power.

In addition to this, based on the data in the cockpit display, maintenance for the aircraft can be scheduled when it is required. This avoids the need to ground the aircraft for a significant period of time in order to perform unnecessary maintenance. Thus the present system will reduce the overall cost-per-mile running costs of the aircraft by increase the operational availability of the aircraft.

Due to being able to accurately track the consumption of the fatigue life for each component, the system can maximise the life time of critical parts. This can be achieved by "resting" certain parts when possible to prolong their lifetime.

Accurately determining when maintenance is actually required for the propeller, simplifies the logistics for maintenance and repair operations. Rather than the necessary resources being used on maintenance that is not required, it can be diverted to urgent cases. Furthermore, the system allows the degradation of the system to be monitored in real-time and so it can be determined when the component is likely to fail. Maintenance can be planned accordingly.

The invention claimed is:

1. A system for monitoring propeller health comprising:
    a processing unit having a processor which is programmed to apply a plurality of algorithms to inputted aircraft parameter data;
    a plurality of data inputs for inputting aircraft parameter data into the algorithms, wherein the processor is configured to apply the algorithms to the aircraft parameter data to determine at least the fatigue life consumption of one or more critical components of a propeller; and
    an output device which is able to output an indication of the determined fatigue life consumption to an observer;
    wherein the fatigue life consumption is determined based on actual aircraft usage;
    and wherein the aircraft data comprises one or more of: air speed, altitude; flap setting; aircraft altitude; pitch rate; roll rate; and yaw rate.

2. The system according to claim 1, wherein the algorithms are physics based algorithms and/or empirically derived algorithms.

3. The system according to claim 1, wherein the system comprises a propeller.

4. The system according to claim 1, wherein the output device comprises a visual display in a cockpit of an aircraft.

5. The system according to claim 4, wherein the fatigue life consumption is displayed as a percentage of an approved fatigue life figure.

6. The system according to claim 1, wherein an alert for maintenance is triggered if:
    the fatigue life consumption reaches a pre-determined threshold;
    propeller loading exceeds a predetermined value; or
    a flight exhibits high life consumption.

7. The system according to claim 6, wherein:
    the predetermined threshold is in the range of 80% to 99% of an approved fatigue life figure;
    the propeller loading is a value that is in the range of 80% to 99% of a maximum propeller loading figure, or is a value at or exceeds 100% of a maximum propeller loading figure; and/or
    the flight's life consumption is a value in the range of 80% to 99% of a maximum life consumption figure, or is a value at or exceeds 100% of a maximum life consumption figure.

8. The system according to claim 1, wherein the processing unit is within a Full Authority Digital Engine Control (FADEC), or wherein the aircraft parameter data is supplied by the FADEC.

9. The system according to claim 1, wherein the system comprises an aircraft having a plurality of sensors to detect different types of aircraft parameter data and communication circuits to feed the aircraft parameter data to a FADEC.

10. The system according to claim 1, wherein the aircraft data further comprises engine data including one or more of:

rotational speed, throttle setting, thrust, engine temperature shaft horsepower, torque and engine pressure ratio.

11. The system according to claim 1, wherein the algorithms are condition-determining algorithms.

12. A method of monitoring propeller health comprising:
inputting aircraft parameter data into a plurality of algorithms;
determining, by a processor of a processing unit, at least the fatigue life consumption of one or more critical components of a propeller using the plurality of algorithms based on the aircraft parameter data; and
outputting an indication of the determined fatigue life consumption to an observer;
wherein the fatigue life consumption is determined based on actual aircraft usage; and
wherein the aircraft data comprises one or more of: air speed, altitude; flap setting; aircraft altitude; pitch rate; roll rate; and yaw rate.

13. The method according to claim 12, wherein the method further comprises the step of outputting the indication of the determined fatigue life consumption to an observer as a percentage of an approved fatigue life figure optionally an aviation authority approved fatigue life figure.

14. The method according to claim 13, wherein the approve fatigue life figure is an aviation authority approved fatigue life figure.

15. The method according to claim 12, wherein the method further comprises the step of comparing the fatigue life consumption to a predetermined threshold.

16. The method according to claim 15, wherein the method further comprises the step of triggering an alert for maintenance if the fatigue life consumption reaches a predetermined threshold.

* * * * *